UNITED STATES PATENT OFFICE.

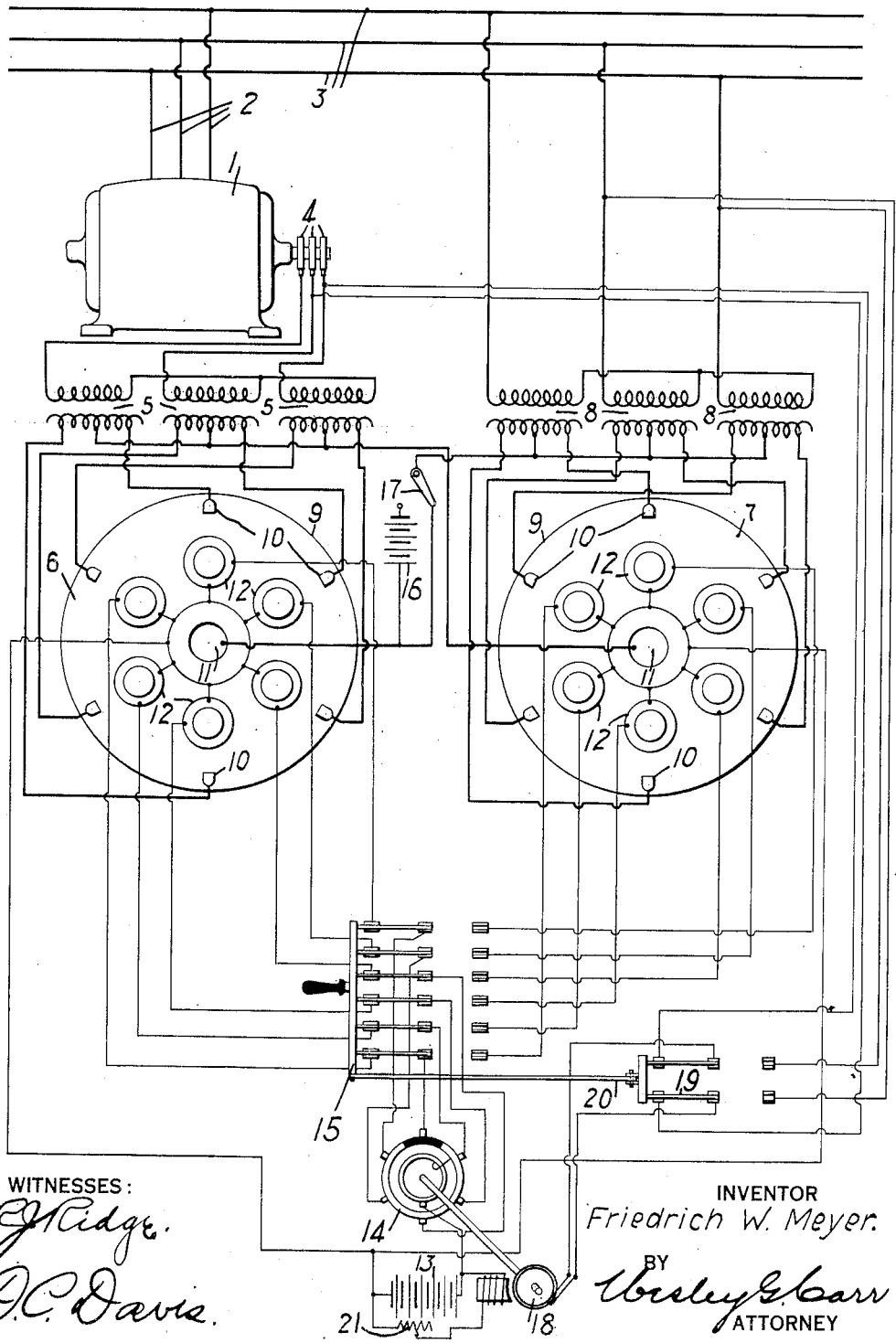

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

FREQUENCY-CHANGING SYSTEM.

1,222,440.      Specification of Letters Patent.      Patented Apr. 10, 1917.

Application filed March 24, 1915. Serial No. 16,687.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Frequency-Changing Systems, of which the following is a specification.

My invention relates to systems of control for induction motors, and it has for its object to provide circuits and apparatus whereby a motor of the type indicated may be conveniently regulated, at both under-synchronous and over-synchronous speeds, in a simple and efficient manner.

The single figure of the accompanying drawing is a diagrammatic view of an induction motor, with its attendant supply and control circuits constructed in accordance with my invention.

Induction motors, especially of the polyphase type, are well adapted for use in industrial and railway applications because of their inherent lightness, good starting characteristics, absence of a commutator and small cost. The polyphase induction motor is subject to the disadvantage, however, that it is essentially a constant-speed machine, tending to run slightly below synchronism. The speed may be lowered by inserting a resistance in the secondary winding but such methods of speed control are obviously extremely wasteful. It is desirable, therefore, to provide systems whereby any desired amount of energy may be derived from the secondary member and returned to the source so that waste is avoided. Furthermore, it is frequently desirable to run an induction motor at over-synchronous speeds by injecting energy to the secondary member thereof directly from the source. By my invention, I accomplish both of the above-mentioned objects in a simple and effective manner.

Referring to the drawing, the primary winding of an induction motor 1 is connected, by suitable leads 2, to a set of supply mains 3 attached to any suitable source of polyphase alternating current. The induction motor 1 is provided with a wound rotor equipped with slip-ring terminals 4. Energy taken from the slip rings 4 may be transmitted through suitable adjustable transformers 5—5 to a vapor-arc device 6 adapted to operate either as a rectifier or as a de-rectifier. A similar vapor-arc device 7 is connected thereto and is, in turn, connected, through suitable adjustable transformers 8—8, to the mains 3. The vapor-arc devices 6 and 7 are preferably of the type illustrated and claimed in my copending application, Serial No. 846,365, filed June 20, 1914 and assigned to the Westinghouse Electric & Manufacturing Company. Briefly speaking, each of them constitutes an exhausted container 9 provided with a plurality of anodes 10—10 and with a cathode 11. An electromagnet 12 is associated with each anode 10. A magnet-energizing device, comprising a unidirectional source of energy 13 and a continuously rotating switch device 14, may be connected either to the device 6 or to the device 7 by a suitable multipole, double-throw switch 15 or by other equivalent means. The rotating switch 14 may be driven in synchronism with the frequency of the main current supply or of the motor secondary output by a synchronous motor 18 arranged to be connected to either alternating current circuit by a double-throw switch 19, preferably interlocked with the switch 15 as, for example, by a bar 20. As shown, the switch 14 is connected to the vapor-arc device 6 and each of the magnets 12 is demagnetized for an instant in rapid succession so that there is provided, within the device 6, a magnetic field embracing the entire arc zone, with the exception of a single band or spot which is free from flux and which sweeps around over each anode at a velocity determined by the speed of rotation of the switch 14 and, therefore, by the frequency of the motor secondary current. The cathode 11 of the device 6 is connected to the mid points of one set of windings of the transformers 8—8, the terminals of which are connected to the anodes 10—10 in the device 7 and, in like manner, the cathode 11 of the device 7 is connected to the mid points in one set of windings in the transformers 5—5. A battery 16, or other source of direct current, may be inserted in the connection between the devices 6 and 7 by a suitable switch 17, for a purpose to be hereinafter pointed out.

Having thus described the structure of my invention, the operation is as follows: At the start, the secondary windings of the motor 1 should have a high voltage and, accordingly, the ratio of transformation of the transformers 5—5 should be adjusted to a large value, assuming current flow in a downward direction. The energy thus derived from the secondary member 1 is rectified in the device 6, as in the ordinary vapor-arc rectifier. The magnets 12 in the device 6 should be deënergized for this operation and the switch 15 is therefore thrown to the right, causing a de-rectifying magnetic field to sweep around within the device 7. Rectified current from the device 6 is supplied to the device 7, is there de-rectified and transformed into alternating current of line frequency and returned to the line after proper voltage adjustment in the transformers 8—8.

In over-synchronous operation, the above-mentioned operation is reversed, energy is derived from the mains 3, is rectified within the device 7, is de-rectified within the device 6 to secondary frequency and supplied to the secondary winding of the motor through the slip rings 4.

As the motor 1 approaches synchronous speed, the voltage of the secondary winding thereof gradually falls until it is less than the back electromotive force of the vapor-arc within the device 6, which is generally in the neighborhood of ten volts. Under these conditions, the voltage in the unidirectional circuit may be increased to a value sufficient to maintain a rectifying arc by the insertion of the battery 16. It will be understood that this operation is in addition to that of ordinary keep-alive circuits with which the devices 6 and 7 should be equipped, as is customary in rectifier practice. By this means, accurate speed regulation of the motor 1 may be obtained in a smooth and uniform manner up to, through, and above synchronous speed.

It will be obvious to those familiar with the art that the function of applicant's apparatus might readily be performed by a single rectifier and a single de-rectifier, together with attendant circuits, whereby the two pieces of apparatus could be bodily interchanged when changing from under-synchronism to over-synchronism but such an arrangement would involve making and breaking contact in circuits carrying heavy working currents, whereas, by my invention, it is necessary only to transfer connections in circuits carrying small exciting currents and even this switching may be done away with by providing a separate device 14 for each of the devices 6 and 7.

Although I have shown a three-phase secondary member and a three-phase source of supply, it is obvious that my invention would work equally well with any desired number of phases greater than one, in the secondary member of the motor 1, associated with any other desired number of phases greater than one in the source of supply.

As I am able to advance the arc location in the device 6 by over-excitation of the synchronous motor 18 at a rheostat 21, I may advance the phase of the alternating current injected into the motor secondary member and, therefore, improve the power factor of the motor during over-synchronous operation. A like result may be obtained during under-synchronous operation by connecting an arc-controlling circuit with the device 6, an expedient which is unnecessary when the device 6 is operating merely as a rectifier in the under-synchronous speed control of the motor.

While I have described my invention in several embodiments, it will be apparent to those skilled in the art that it is susceptible of various minor changes and modifications without departing from the spirit thereof, and I desire, therefore, that no limitations shall be placed thereupon except such as are imposed by the prior art or are specifically set forth in the appended claims.

I claim as my invention:

1. A reversible frequency-changing system comprising two vapor-arc devices, each of which is adapted to operate either as a rectifier or as a de-rectifier, and a unidirectional-current circuit connecting the two vapor-arc devices, a device for determining the frequency of the output of a de-rectifier, and means for associating said device with either of said vapor-arc devices in accordance with the direction of energy transfer.

2. The combination with two alternating-current systems of different frequency, of energy transferring apparatus connected therebetween comprising two vapor-arc devices, each of which is adapted to operate either as a rectifier or as a de-rectifier, a device for determining the output frequency of a vapor-arc device when operating as a de-rectifier, and means for associating said device with either of said vapor-arc devices in accordance with the direction of energy transfer between said two systems.

3. A reversible frequency-changing system comprising two vapor-arc devices each of which is provided with a plurality of anodes, a cathode, and with magnetic arc-rotating means for forcing an arc therein to impinge upon said anodes at a predetermined rate, a unidirectional current circuit connecting said two devices, exciting means for energizing said arc rotating means, and means for connecting said exciting means to either of said arc-rotating means in accordance with the direction of energy transfer through said system.

In testimony whereof, I have hereunto subscribed my name this 12th day of Mar. 1915.

FRIEDRICH W. MEYER.

Witnesses:
D. C. DAVIS,
B. B. HINES.